Nov. 11, 1969     W. E. MARTIN     3,477,245
FLEXIBLE COUPLING DEVICE
Filed Jan. 10, 1968
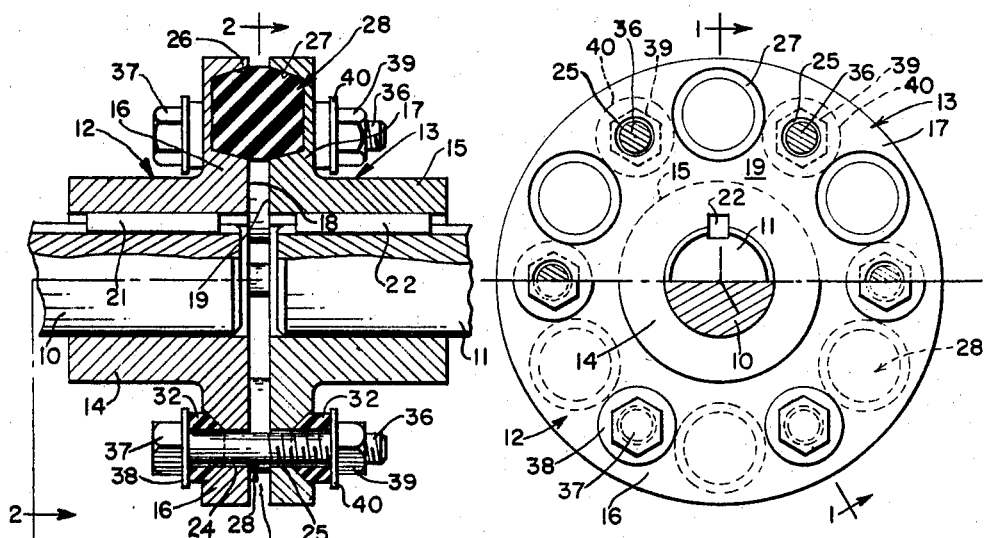
FIG. 1     FIG. 2
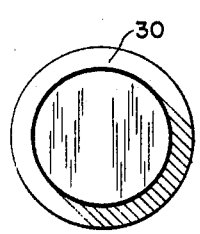 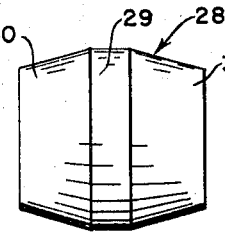 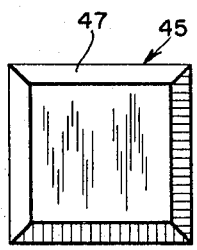 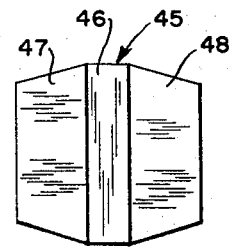
FIG. 3     FIG. 4     FIG. 6     FIG. 7
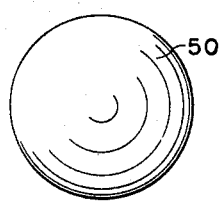 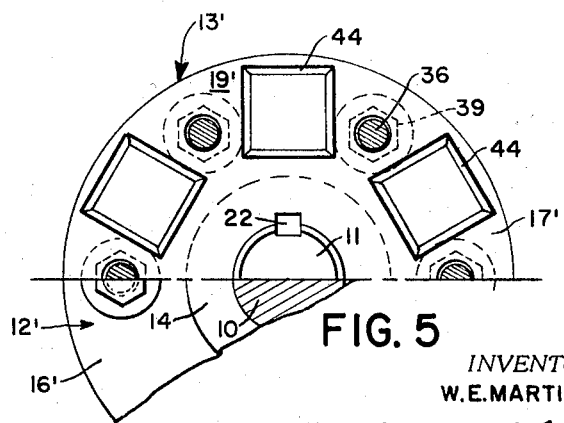
FIG. 8     FIG. 5
INVENTOR.
W.E.MARTIN
BY *William A. Murray*
ATTORNEY

United States Patent Office 3,477,245
Patented Nov. 11, 1969

3,477,245
FLEXIBLE COUPLING DEVICE
William E. Martin, P.O. Box 187,
Kewanee, Ill. 61443
Filed Jan. 10, 1968, Ser. No. 696,850
Int. Cl. F16d 3/52
U.S. Cl. 64—11                                    15 Claims

ABSTRACT OF THE DISCLOSURE

A flexible coupling for connecting a pair of axially aligned shafts that includes a pair of radially extending couplers mounted on the respective shafts; axially extending bolts extending between the couplers and anchored thereto in resilient elastomer sockets so as to permit the couplers to yield relative to one another; and elastomer elements or inserts extending between the couplers and interjoining the couplers to afford a resilient torque drive between the couplers.

Background of the invention

This invention relates to a flexible coupling device drivingly interconnecting the ends of axially aligned shafts and more particularly to a plurality of angularly spaced yieldable elastomer members that extend between and interjoin a pair of coupled members fixed to rotate with the respective shafts, and whereby the elastomer members yieldably and resiliently operate as a torsional drive between the members and dampen vibrations that are normally occurring at the device due to slight misalignment or momentary overload or shock load between the shafts.

It has heretofore been known to provide a coupler device composed of a pair of conventional coupler members having radial flanges and to have a central plate disposed between the flanges. The respective flanges are connected to the central plate by bolts imbedded or anchored in rubber or elastomer sockets carried by the central plate. Thus, the elastomer sockets dampen normal vibrations that may occur due to misalignment or overloads between the shafts. Such a coupling device is shown and described in U.S. Patent 2,879,650 which issued to the present inventor Mar. 31, 1959.

One problem existing with the above described type of flexible coupling device is that while the rubber sockets anchoring the bolts in the flanges are yieldable upon sufficient stress between the coupler members, they will often lack sufficient resiliency to force the members back into proper alignment upon the stress being removed. Also, while the bolts interconnect the flanges of the couplers and operate to drivingly connect them, it is often desirable to provide a direct resilient driving connection between the flanges.

Summary

With the above in mind, it is the primary object of the present invention to provide a resilient driving connection between the coupler flanges that includes a plurality of angularly spaced and axially extending yieldable or resilient elastomer elements that have opposite ends thereof anchored in the respective members. The elements operate in their aggregative as a resilient torsional drive between the flanges. It is contemplated the coupler flanges will also be connected to one another by bolts anchored in the respective flanges by resilent liners that permit momentary movement or yielding between the flanges. The bolts and their associated nuts may be further utilized to compress the elastomer elements and liners to thereby affect the resiliency characteristics thereof.

Brief description of the drawings

FIG. 1 is a vertical sectional view taken through the axis of the resilent coupling device and its associated shafts and as taken substantially along the line 1—1 of FIG. 2.

FIG. 2 is a sectional view taken substantially along the line 2—2 of FIG. 1 and with the elastomer elements removed from the upper half portion of one coupler member.

FIG. 3 is an end view of an elastomer connecting element.

FIG. 4 is a side view of the elastomer element shown in FIG. 3.

FIG. 5 is a partially view similar to FIG. 2 showing a modified form of the invention.

FIG. 6 is an end view of the elastomer connecting element utilized in the coupling device shown in FIG. 5.

FIG. 7 is a side view of the elastomer element shown in FIG. 6.

FIG. 8 is a view of still a further form of the elastomer element that interconnects the coupler members.

Description of the preferred embodiments

Referring now to FIGS. 1 through 4, the coupling device is mounted on adjacent ends of a pair of axially aligned shaft 10, 11 and includes a pair of coupler members 12, 13 having hub portions 14, 15 respectively and a pair of radial flanges 16, 17 respectively. The flanges have opposed radial surfaces 18, 19 facing one another across an axial gap 20. The hub portions 14, 15 are keyed at 21, 22 to the shafts 10, 11 so as to rotate therewith.

The flanges 16, 17 are provided with axially aligned openings 24, 25 respectively with each opening being provided with a relatively small portion extending from its respective surface 18 or 19 and a continuing tapered or outwardly enlarging frusto conical shaped portion extending to the opposite side of the respective flange. As may best be seen from viewing FIG. 2, the openings 24, 25 are equally angularly spaced around the respective flanges, and there are six openings 24, 25 in each of the respective flanges.

Positioned angularly between the respective openings 24, 25 and in the respective flanges 16, 17 are tapered recesses or openings 26, 27. The openings 26, 27 extend axially partially through the flanges from the surfaces 18, 19 and are frusto conical shaped, the small portions of the recesses being axially offset from the surfaces. The openings 26, 27 face one another across the gap 20. Seated in the openings are opposite end portions of elastomer elements or inserts 28. As may best be seen from viewing FIGS. 3 and 4, the inserts are barrel shaped with each having an enlarged and rounded central portion 29 and integral or frusto conical shaped end portions 30, 31 that seat in the openings or recesses 26, 27 respectively.

Seated in the frusto conical end portions of openings 24, 25 are elastomer bushings or liners 32 which are also frusto conical shaped. Threaded elements or bolts 36 extend through the liners 32 and the respective openings 24, 25. The bolts 36 have head ends 37 and washers 38 bearing against the liners 32 in the flange 16. Nuts 39 and washers for the bolts 36 bear against the opposite counter part liners 32 in the flange 17. Referring to FIG. 1 it should be noted that the small portions of the respective openings 24, 25 are larger than the shanks of the bolts 36 and consequently the bolts are suspended in the respective flanges 16, 17 by the resilient liners 32. When the nuts 39 are tightened, the end portions of the bolts are actually imbedded in the elastomer bushings or liners 32.

When the entire device is assembled and the nuts 39 tightened on the bolts 36, the elastomer inserts 28 and the liners 32 are compressed in their respective seats. The degree of tightening of the nuts 39 determine the degree of resiliency and yieldability of the inserts and liners. Thus, there is adjustability of the effective characteristics of the flexible coupling. Also, as the assembled device is first used, the various inserts and liners will adjust to the characteristics of the drive and often further adjustment of the nuts 39 will be required after a trial or run-in period of the assembly.

The bolts 36 and nuts 39 will, of course, interconnect the flanges 16, 17. However by the bolts 36 being suspended in the liners 32 there is created a resilient and yieldable interconnection. The inserts 28 bridging between the flanges 16, 17 will provide a torque drive between the two flanges but these too will yield to momentary stresses. The inserts 28 and the liners 32, being resilient, will force the coupler members 12, 13 to return to proper alignment upon the stresses being removed.

In the form of the invention shown in FIGS. 5 through 7, there is provided bolts 36, nuts 39 and liners 32 similar to the previous form and consequently such are given identical numbers. The bolts 36 extend through flanges 16', 17' of coupler members 12', 13' and drivingly interconnect the shafts 10, 11. Each flange is provided with truncated recesses that extend from the opposed faces of the flanges 16', 17', one face being shown as 19'. Elastomer inserts 45 extend across the axial gap (not shown) between the flanges 16', 17'. Each insert 45 is composed of a large square sectioned central portion 46 and integral truncated end portions 47, 48. The end portions 47, 48 recess or seat in the truncated openings 40 of the flanges 16', 17' and serve in their aggregative as a resilient torque drive between the flanges.

FIG. 8 shows a further form of an elastomer insert 50. The insert may be used in the type of recess shown in FIGS. 1 and 2 or FIG. 5 and the portions of the insert seated in the recesses will deform to the shape of the recesses when the bolts 36 and nuts 39 are tightened. Also, if desired, the recesses themselves in the respective flanges may be semispherical shaped to conform to and receive the sides of the spherical insert 50.

What is claimed is:

1. A flexible coupling for joining the ends of a pair of axially aligned shafts comprising: a pair of rigid radial flange members fixed to rotate with the respective shafts; a plurality of interconnecting elements yieldably supported by and axially interconnecting the respective flange members; and a plurality of angularly spaced elastomer elements disposed between and engaging the flange members to effect a resilient torque drive between the flange members.

2. The structure as set forth in claim 1 in which the radial flange members have surfaces opposed to and facing one another across an axial gap and the elastomer elements engage and are held against the surfaces of the members.

3. The structure as set forth in claim 1 in which the radial flange members have surfaces opposed to and facing one another across an axial gap, and the members have angularly spaced recesses extending axially from the surfaces; and the elastomer elements extend axially across the gap and have end portions thereof seated in the recesses.

4. The structure as set forth in claim 3 in which the recesses in the surfaces are axially aligned with one another across the gap and opposite ends of the elastomer elements seat in the recesses.

5. The structure as set forth in claim 3 in which the recesses are axially tapered from the surfaces to comparatively smaller portions offset from the surfaces.

6. The structure as set forth in claim 5 in which the recesses are frusto conical shaped.

7. The structure as set forth in claim 6 in which opposite ends of the elastomer elements are frusto conical shaped to set in the respective recesses.

8. The structure as set forth in claim 5 in which the recesses are truncated in shape and opposite ends of the respective elastomer element sare truncated to be received in the recesses.

9. Structure as set forth in claim 4 in which each of the elastomer elements have large central portions and smaller portions on opposite sides of the central portion.

10. The structure as set forth in claim 9 in which the elastomer elements are spherical shaped.

11. A flexible coupling device for drivingly connecting a pair of axially aligned shafts comprising: a pair of coupler members fixed to rotate with the respective shafts and having radially extending flanges with opposed radial faces defining opposite sides of an axial gap, and having openings extending axially from the faces; a resilient torsional drive between the members composed of a plurality of axially extending elastomer elements spaced angularly about the members disposed in the gap and having opposite sides thereof seating in the openings; and means for adjusting the gap to thereby affect the resilient characteristics of the elastomer elements.

12. The structure as set forth in claim 11 in which the coupler members have radial flanges and the means for adjusting the gap is a plurality of angularly spaced threaded studs that extend from one flange to the other and are suspended in the flanges by elastomer elements, and there are provided on the flanges suitable complementary threaded members for the studs.

13. The structure as set forth in claim 11 in which the shape of the openings and the shape of the sides of the elastomer elements conform to one another.

14. The structure as set forth in claim 11 in which there are provided further openings in the flanges between the openings receiving the elastomer elements, and the means for adjusting the gap is threaded studs that extend through the aforesaid further openings and which may be threadedly adjusted to change the gap.

15. The structure as set forth in claim 14 in which the threaded studs are suspended in the respective flanges by elastomer elements.

References Cited
UNITED STATES PATENTS

| | | | |
|---|---|---|---|
| 2,067,284 | 1/1937 | Pearce | 64—27 X |
| 2,537,847 | 1/1951 | Neher | 64—27 X |
| 2,879,650 | 3/1959 | Martin | 64—10 |
| 3,199,315 | 8/1965 | Morse | 64—27 |

HALL C. COE, Primary Examiner